United States Patent
Priou et al.

(12) 
(10) Patent No.: US 6,265,496 B1
(45) Date of Patent: Jul. 24, 2001

(54) STABLE COMPOSITIONS WITH BASED OF POLYORGANOSILOXANES WITH CROSS-LINKABLE FUNCTIONAL GROUPS FOR PRODUCING ANTIADHESIVE COATINGS

(75) Inventors: Christian Priou, West Windsor, NJ (US); André Soldat, Lyons (FR)

(73) Assignee: Rhodia Chimie, Boulogne Billancourt Ceded (FR)

( * ) Notice: Subject to any disclaimer, the term of this patent is extended or adjusted under 35 U.S.C. 154(b) by 0 days.

(21) Appl. No.: 09/331,315

(22) PCT Filed: Dec. 22, 1997

(86) PCT No.: PCT/FR97/02382

§ 371 Date: Aug. 30, 1999

§ 102(e) Date: Aug. 30, 1999

(87) PCT Pub. No.: WO98/28375

PCT Pub. Date: Jul. 2, 1998

(30) Foreign Application Priority Data

Dec. 24, 1996 (FR) .................................. 96 15968

(51) Int. Cl.$^7$ .................................. C08L 83/08
(52) U.S. Cl. .................. 525/477; 528/32; 528/41; 528/38; 427/515; 522/99; 522/31; 522/66; 430/280.1; 430/281.1
(58) Field of Search ................ 525/477; 528/32, 528/41, 38; 427/515; 522/99, 31, 66; 430/280.1, 281.1

(56) References Cited

U.S. PATENT DOCUMENTS

| 4,252,933 | * | 2/1981 | Sumida . |
| 4,359,545 | * | 11/1982 | Ona et al. . |
| 4,698,406 | * | 10/1987 | Lo et al. . |
| 5,025,076 | * | 6/1991 | Tanaka et al. . |
| 5,668,192 | * | 9/1997 | Castellanos et al. . |
| 5,721,297 | * | 2/1998 | Gay et al. . |

FOREIGN PATENT DOCUMENTS

| 196 12746 | 10/1996 | (DE) | ............................ C09D/163/00 |
| 0343 717 | 11/1989 | (EP) | ............................ C08G/77/38 |
| 0614958 | 9/1994 | (EP) | ............................ C07D/183/06 |
| 0703 236 | 3/1996 | (EP) | ............................ C07F/5/02 |

OTHER PUBLICATIONS

International Search Report.

\* cited by examiner

*Primary Examiner*—Robert Dawson
*Assistant Examiner*—Kuo-Liang Peng
(74) *Attorney, Agent, or Firm*—Jean-Louis Seugnet

(57) ABSTRACT

The invention concerns novel compositions containing at least a polyorganosiloxane (A) with crosslinkable functional groups, stable for use and storing, characterized in that said compositions contain at least a stabilizing amino agent consisting of a polyorganosiloxane (B) functionalised with at least an amino group, and a priming system for hardening by radiation, particularly UV radiation, the polyorganosiloxane (B) being miscible with the polyorganosiloxane (A). In general these stable and cross-linkable compositions are in liquid form and homogeneous.

27 Claims, No Drawings

STABLE COMPOSITIONS WITH BASED OF POLYORGANOSILOXANES WITH CROSS-LINKABLE FUNCTIONAL GROUPS FOR PRODUCING ANTIADHESIVE COATINGS

This application is an application under 35 U.S.C. Section 371 of International Application Number PCT/FR97/02382, filed on Dec. 22, 1997.

The present invention relates to stable compositions based on polyorganosiloxanes containing cationically crosslinkable functional groups, to their use for preparing anti-adherent or anti-adhesive coatings and to articles consisting of a solid support, at least one surface of which is made anti-adherent or anti-adhesive by coating with the said functional polyorganosiloxanes crosslinked by photochemical activation and/or by activation with a beam of electrons.

It is known practice, for preparing anti-adhesive coatings, to use compositions based on a polyorganosiloxane containing functional groups (such as epoxy, vinyl ether, etc.) to which is added a cationic initiator onium salt for the crosslinking (U.S. Pat. Nos. 4,450,360; 4,576,999; 4,640,967).

Compositions based on UV-crosslinkable polyorganosiloxanes of the prior art can have problems of stability and of ageing in the presence or absence of light. In particular, it has been found that in the presence of a photoinitiator in the said compositions conditioned in liquid form, uncontrolled polymerization reactions of the polyorganosiloxanes took place in the medium, this occurring without UV irradiation.

Furthermore, when a photoinitiator is used under liquid conditioning, it has a tendency to degrade, and gives reduced performance if it is used after a long period of storage.

The Applicant has found and developed novel compositions based on at least one polyorganosiloxane (A) containing crosslinkable functional groups, these compositions having none of the drawbacks of the compositions of the prior art. In particular, these novel compositions based on polyorganosiloxane(s) (A) contain at least one stabilizing amino agent consisting of a polyorganosiloxane (B) functionalized with at least one amino group. These novel crosslinkable compositions have markedly improved stability on storage and also markedly improved stability during their use. Thus, uncontrolled polymerization reactions in the compositions are all but eliminated, without, however, reducing the ability of the said compositions to crosslink under controlled conditions.

The novel compositions in accordance with the invention comprise at least one polyorganosiloxane (A) containing crosslinkable functional groups, which is stable on use and on storage, characterized in that the said compositions comprise at least one stabilizing amino agent consisting of a polyorganosiloxane (B) functionalized with at least one amino group, and a system for initiating curing under radiation, in particular UV, the polyorganosiloxane (B) being miscible with the polyorganosiloxane (A).

In general, the stable and crosslinkable compositions according to the invention are in liquid and homogeneous form.

Advantageously, the amino group of the polyorganosiloxane (B) is an amino group in which the amine is sterically hindered. More specifically, the polyorganosiloxane (B), used in the compositions according to the invention, is a linear, cyclic or three-dimensional polyorganosiloxane with a molecular mass of from 200 to 200,000 grams per mole and which comprises identical or different units of general formula (I):

in which:

(1)
 a=0, 1, 2 or 3
 b=0, 1, 2, or 3
 c=0, 1, 2 or 3
 a+b+c≦3

(2) the symbols R are identical and/or different and represent a monovalent hydrocarbon-based radical chosen from linear or branched alkyl radicals containing from 1 to 4 carbon atoms, a hydrogen radical, linear or branched alkoxy radicals containing from 1 to 4 carbon atoms, a phenyl radical and, preferably, a hydroxyl radical, an ethoxy radical, a methoxy radical or a methyl radical, (3) the symbols X are cationically crosslinkable, identical or different functional residues, preferably an epoxy functional and/or vinyloxy functional group, connected to the silicon of the polyorganosiloxane via a divalent radical containing from 2 to 20 carbon atoms and which can contain at least one hetero atom, preferably oxygen, (4) the symbols V are identical and/or different functional residues and represent a residue containing one (or more) stearically hindered piperidyl group(s) chosen from:

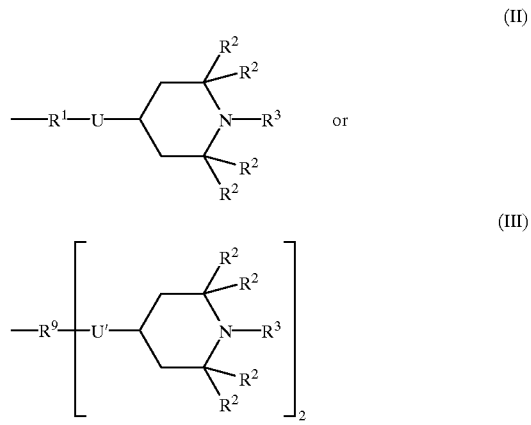

For the residues of formula (II):

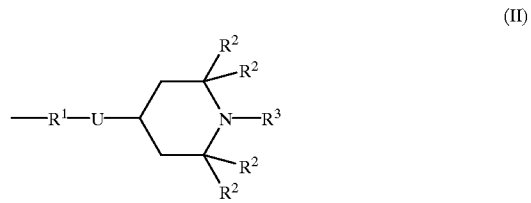

R¹ is a divalent hydrocarbon-based radical chosen from:
 linear or branched alkylene radicals containing 2 to 18 carbon atoms;
 alkylenecarbonyl radicals in which the alkylene part is linear or branched contains 2 to 20 carbon atoms;
 alkylenecyclohexylene radicals in which the alkylene part is linear or branched contains 2 to 12 carbon atoms and the cyclohexylene part contains an OH group and optionally 1 or 2 alkyl radicals containing 1 to 4 carbon atoms;

the radicals of formula —R⁴—O—R⁴ in which the radicals R⁴, which may be identical or different, represent alkylene radicals containing 1 to 12 carbon atoms;

the radicals of formula —R⁴—O—R⁴ in which the radicals R⁴ have the meanings given above and one or both of them are substituted with one or two —OH group(s);

the radicals of formula —R⁴—COO—R⁴ in which the radicals R⁴ have the meanings given above;

the radicals of formula —R⁵—O—R⁶—O—CO—R⁵ in which the radicals R⁵ and R⁶, which may be identical or different, represent alkylene radicals containing 2 to 12 carbon atoms and the radical R⁶ is optionally substituted with a hydroxyl radical;

U represents —O— or —NR⁷—, R⁷ being a radical chosen from a hydrogen atom, a linear or branched alkyl radical containing 1 to 6 carbon atoms and a divalent radical of formula:

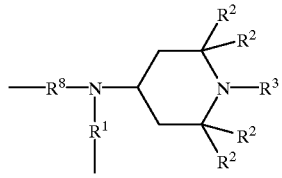

in which R¹ has the meaning given above, R² and R³ have the meanings given below and R⁸ represents a linear or branched divalent alkylene radical containing from 1 to 12 carbon atoms, one of the valency bonds (that of R⁸) being connected to the atom of —NR⁷—, the other (that of R¹) being connected to a silicon atom;

the radicals R² are identical or different and are chosen from linear or branched alkyl radicals containing 1 to 3 carbon atoms and the phenyl radical;

the radical R³ represents a hydrogen radical or the radical R² or O●.

For the residues of formula (III):

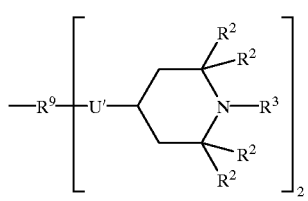

(III)

R⁹ is chosen from a trivalent group of formula:

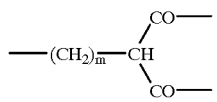

in which m represents a number from 2 to 20, and a trivalent group of formula:

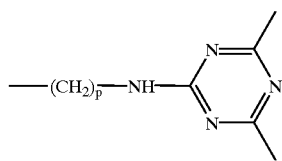

in which p represents a number from 2 to 20;

U' represents —O— or NR¹⁰ —, R¹⁰ being a radical chosen from a hydrogen atom and a linear or branched alkyl radical containing 1 to 6 carbon atoms;

R² and R³ have the same meanings as those given with regard to formula (II).

According to one preferred embodiment of the invention, the polyorganosiloxane (B) has a molecular mass of from 1000 to 50,000 grams per mole.

In accordance with the definition of the polyorganosiloxanes (B) given above, the latter preferably have the average general formula (IV):

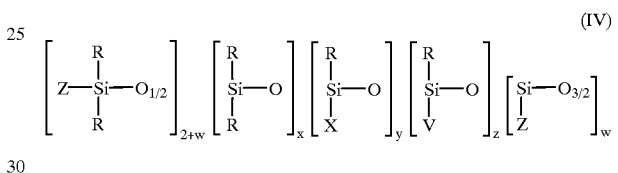

(IV)

in which:

(1') the symbols R are identical or different and have the meanings given above;

(2') the symbols X are identical or different and have the meanings given above;

(3') the symbols V are identical or different and have the meanings given above;

(4') the symbols Z are identical or different and represent R and/or V as defined above; and (5') x, y, z and w are totally independent fractional values chosen such that:
4<x+y+z+w<10,000, preferably 10<x+y+z+w<2000,
0<x<8000, preferably 2<x<1500,
0<y<1000, preferably 1<y<200,
0.2<z<500, preferably 1<z<100,
and 0<w<300, preferably 0<w<100.

In particular, the best results were obtained with polyorganosiloxanes (B) in which the independent fractional values x, z, and w are such that:
20<x+y+z+w<100
5<x<80
2<y<10
1<z<50
and 0<w<5.

Moreover, the symbol Z is preferably a stearically hindered cyclic amine comprising branched alkyl groups of 1 to 4 carbon atoms α to the nitrogen atom. In particular, the stearically hindered cyclic amine is an amine containing at least one piperidyl unit.

The curing-initiator systems used in the compositions according to the invention are advantageously onium salts. In particular, the onium salts are chosen from at least one element from groups VA, VIA and VIIA of the Periodic Table (Chem. & Eng. News, Vol. 63, No. 5, 26 of Feb. 4, 1985), the cationic species and anionic species of which are defined below. The curing-initiator systems used in the context of the invention comprise one or more onium salts.

The cationic species of the onium salt is chosen from:

(1) Onium salts of formula $$[(R_{1'})_n\text{—}A\text{—}(R_{2'})_m]^+ \quad (V)$$

in which:
- A represents an element from groups 15 to 17, such as I, S, Se, P and N,
- the symbol $R_1'$ represents a $C_6$-$C_{20}$ carbocyclic or heterocyclic aryl radical, preferably phenyl, tolyl or toluyl, it being possible for the said heterocyclic radical to contain at least one hetero element, preferably nitrogen and/or sulphur,
- the symbol $R_2'$ represents $R_1'$, a linear or branched alkyl or alkenyl radical containing 1 to 30 carbon atoms,
- the said radicals $R_1'$ and $R_2'$ optionally being substituted with an alkoxy group containing between 1 and 25 carbon atoms, an alkyl group containing 1 to 25 carbon atoms, a nitro group, a chloro group, a bromo group, a cyano group, a carboxyl group and/or a mercapto group,
- n is an integer ranging from 1 to v+1, v being the valency of the element A,
- m is an integer ranging from 0 to v−1, with n+m=v+1.

(2) The oxoisothiochromanium salts of formula:

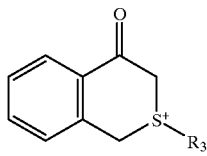

in which the symbol $R_3$ represents a linear or branched alkyl radical containing 1 to 20 carbon atoms, a linear or branched cycloalkyl radical containing 1 to 20 carbon atoms, or an aryl radical.

By way of example, the oxoisothiochromanium salts which can be used are those which are described in particular in patent application WO A90/11303 (published on Oct. 4, 1990). As oxoisothiochromanium salts which are particularly suitable, mention will be made in particular of the sulphonium salt of 2-ethyl-4-oxoisothiochromanium or of 2-dodecyl-4-oxoisothiochromanium.

The anionic species of the said onium salt is chosen from the group consisting of $SbF_6^-$, $PF_6^-$, $AsF_6^-$, $CF_3SO_3^-$, $BF_4^-$, $BCl_4^-$, $B(O_3SCF_3)_4^-$, $B(O_3SC_2F_5)_4^-$, $B(O_3SC_4F_9)_4^-$. However, other anionic species can also be used, such as those described in patent application EP-A-697,449 (page 4, lines 28 to 37).

In addition, in the case of an anionic borate species, this can be chosen from the group consisting of the species of formula $[BX_{a'}(R'_{3'})_{b'}]^-$ (VI), which moreover comprises $BF_4^-$, $BCl_4^-$, in which:
- a' is an integer between 0 and 4,
- b' is an integer between 0 and 4, with a'+b'=4,
- the symbols X represent:
  - a halogen atom, preferably chlorine or fluorine,
  - an OH function with a'=0 to 2,
- the symbols $R_3$, are identical or different and represent:
  - a phenyl radical substituted with at least one electron-withdrawing group, preferably $CF_3$, $OCF_3$, $NO_2$ or CN, or with at least two halogen atoms, preferably fluorine,
  - an aryl radical containing at least two aromatic rings, such as biphenyl or naphthyl, optionally substituted with at least one electron-withdrawing element or group, preferably $CF_3$, $NO_2$ or CN or a halogen atom, in particular fluorine.

Advantageously, the anionic borate species is chosen from the following anions:

| | | |
|---|---|---|
| $[B(C_6F_5)_4]^-$ | $[B(C_6H_4CF_3)_4]^-$ | $[B(C_6H_3(CF_3)_2)_4]^-$ |
| $[(C_6F_5)_2BF_2]^-$ | $[B(C_6H_4OCF_3)_4]^-$ | $[B(C_6H_3F_2)_4]^-$ |

The onium salts of formula V are described in many documents, in particular in U.S. Pat. Nos. 4,026,705; 4,069,056; 4,136,102; 4,173,476. In particular, the cations used in the context of the invention are the following:

| | |
|---|---|
| $[(\Phi)_2 I]^+$ | $[C_8H_{17}\text{—}O\text{-}\Phi\text{-}|\text{-}\Phi]^+$ |
| $[C_{12}H_{25}\text{-}\Phi\text{-}|\text{-}\Phi]^+$ | $[(C_8H_{17}\text{—}O\text{-}\Phi)_2 I]^+$ |
| $[(\Phi)_3 S]^+$ | $[(\Phi)_2\text{-}S\text{-}\Phi\text{-}O\text{—}C_8H_{17}]^+$ |
| $[\Phi\text{-}S\text{-}\Phi\text{-}S\text{-}(\Phi)_2]^+$ | $[(C_{12}H_{25}\text{-}\Phi)_2 I]^+$ |
| $[CH_3\text{-}\Phi\text{-}|\text{-}\Phi\text{-}CH(CH_3)_2]^+$ | $[CH_3\text{-}\Phi\text{-}|\text{-}\Phi\text{-}CH_3]^+$ |
| et $[(\Phi)_2S\text{-}\Phi\text{-}S\text{-}\Phi\text{-}S(\Phi)_2]^{+2}$ | |

In accordance with the invention, the initiators used are advantageously the following onium borates:

| | |
|---|---|
| $[(\Phi\text{-}CH_3)_2I]^+,[B(C_6F_5)_4]^-$, | $[(\Phi)_2I]^+,[B(C_6F_5)_4]^-$, |
| $[C_{12}H_{25}\text{-}\Phi\text{-}I\text{-}\Phi]^+,[B(C_6F_5)_4]^-$, | $[(C_8H_{17}\text{—}O\text{-}\Phi\text{-}I\text{-}\Phi]^+$, |
| | $[B(C_6F_5)_4]^-$, |
| $[(C_8H_{17}\text{—}O\text{-}\Phi)_2I]^+,[B(C_6F_5)_4]^-$, | $[(\Phi)_2I]^+,[B(C_6H_3(CF_3)_2)_4]^-$, |
| $[(\Phi)_2S\text{-}\Phi\text{-}O\text{—}C_8H_{17}]^+,[B(C_6H_4CF_3)_4]^-$, | $[(C_{12}H_{25}\text{-}\Phi)_2I]^+$, |
| | $[B(C_6F_5)_4]^-$, |
| $[CH_3\text{-}\Phi\text{-}I\text{-}\Phi\text{-}CH(CH_3)_2]^+,[B(C_6F_5)_4]^-$, | $[(\Phi)_3S]^+,[B(C_6F_5)_4]^-$, |
| $[CH_3\text{-}\Phi\text{-}I\text{-}\Phi\text{-}CH(CH_3)_2]^+$, | and |
| $[B(C_6H_4OCF_3)_4]^-$, | |
| $2(B(C_6F_5)_4]^-.[(\Phi)_2S\text{-}\Phi\text{-}S\text{-}\Phi\text{-}S(\Phi)_2]^{+2}$ | |

The onium borates used in the compositions according to the present invention can be prepared by an exchange reaction between a salt of the cationic species and an alkali metal (for example sodium, lithium or potassium) salt of the anionic species. The salt of the cationic species can be, for example, a halide such as a chloride or an iodide, whereas the alkali metal in the salt of the anionic species can be sodium, lithium or potassium.

The operating conditions (respective amounts of reagents, choice of solvents, duration, temperature, stirring) are known and are within the capabilities of a person skilled in the art; these conditions must make it possible to recover the desired initiator salt in solid form by filtration of the precipitate formed, or in oily form by extraction with a suitable solvent.

The alkali metal salts of the anionic species can be prepared in a known manner, by an exchange reaction between a haloboron compound and an organometallic (magnesium, lithium or tin) compound bearing the desired hydrocarbon-based groups, in stoichiometric amount, the said reaction optionally being followed by a hydrolysis using an aqueous alkali metal halide solution; this type of synthesis is described, for example, in "J. of organometallic Chemistry" Vol. 178, pp. 1–4, 1979; "J.A.C. S" 82, 1960, 5298; "Anal. Chem. Acta" 44, 1969, pp. 175–183; U.S. Pat. No. 4,139,681 and DE-A-2,901,367; "Zh. Org. Khim." Vol. 25, No. 5-pp. 1099–1102; May 1989.

The photoinitiator is generally in solid (powder) form and is generally placed in the form of a solution in a solvent or diluent. The weight proportions between the photoinitiator (s), on the one hand, and the solvent, on the other hand, are between 0.1 and 99 parts per 100 parts of solvent and preferably from 10 to 50 parts.

The solution is then used to prepare a bath with the polyorganosiloxane(s) containing cationically-crosslinkable functional groups, such that the concentration of the photoinitiator(s) present is between 0.05 and 2% by weight in the said bath, and preferably between 0.2 and 0.6%.

The solvents which can be used for the photoinitiator are many and varied and are chosen depending on the photoinitiator used and the other constituents of the composition of the invention. In general, the solvents can be alcohols, esters, ethers, ketones, chloro compounds or nitrites.

The alcohols commonly used are para-tolylethanol, isopropylbenzyl alcohol, benzyl alcohol, methanol, ethanol, propanol, isopropanol and butanol. The ethers commonly used are 2-methoxyethanol, 2-ethoxyethanol, diethylene glycol and polyethylene glycol 200. The usual esters are dibutyl maleate, dimethyl ethylmalonate, methyl salicylate, dioctyl adipate, butyl tartrate, ethyl lactate, n-butyl lactate and isopropyl lactate. Other solvents which can be used for the photoinitiator bath and which fall within the other categories of solvents mentioned above are acetonitrile, benzonitrile, acetone, cyclohexanone, tetrahydrofuran, dichloromethane and chlorobenzene.

In addition, among the solvents which can be used to dissolve the photoinitiator(s), certain types of proton-donating organic solvents of aromatic nature and certain types of hydroxylated carboxylic acid esters have properties not only of dissolving the photoinitiators but also of significantly improving their performance in terms of reactivity and kinetics. These two types of solvent, known as reagent diluents, are described below and are advantageously used as solvent for the photoinitiator(s).

The proton-donating organic solvent of aromatic nature is formed by at least one benzyl alcohol of general formula (X) below:

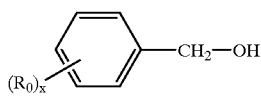

in which:

the groups $R_0$ are identical or different and represent an electron-donating or electron-withdrawing group chosen from linear or branched alkyls containing 1 to 12 carbon atoms, linear or branched alkoxys containing 1 to 12 carbon atoms, cycloalkyls, cycloalkoxys or aryls, which are preferably optionally substituted with halogens, or radicals such as, for example, $NO_2$, x is an integer between 0 and 5.

Preferably, $R^0$ represents a methyl, t-butyl or isopropyl group.

The second type of solvent in which the photoinitiator is preferably dissolved is chosen from hydroxylated carboxylic acid esters which are liquid at room temperature (23° C.) of general formula:

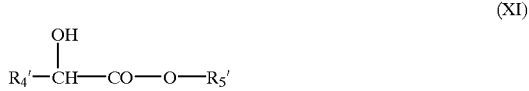

in which:

the symbols $R_4$, and $R_5$, are identical or different and represent:
 a linear or branched $C_1$–$C_{10}$ alkyl radical, optionally substituted with a linear or branched $C_1$–$C_4$ alkoxy group,
 a $C_4$–$C_{10}$ cycloalkyl radical, optionally substituted with one or more linear or branched $C_1$–$C_4$ alkyl or alkoxy groups,
 a $C_5$–$C_{12}$ aryl radical, optionally substituted with one or more linear or branched $C_1$–$C_4$ alkyl or alkoxy groups, and/or
 an aralkyl or aroxyalkyl radical in which the aryl part is a $C_5$–$C_{12}$ group optionally substituted with one or more linear or branched $C_1$–$C_4$ alkyl or alkoxy groups, and the alkyl part is a linear or branched $C_1$–$C_4$ group, the symbol $R_4$ possibly also representing:
 a linear or branched $C_1$–$C_{51}$ alkoxy radical, and/or
 a $C_4$–$C_{10}$ cycloalkyloxy radical, optionally substituted with one or more linear or branched $C_1$–$C_4$ alkyl or alkoxy groups.

These hydroxylated carboxylic acid esters, as solvent, have properties which make it possible to significantly improve the performance in terms of reactivity and kinetics of the photoinitiators, as well as the final properties of the crosslinked coatings obtained. The most advantageous results are obtained with this type of solvent formed by at least one hydroxylated carboxylic acid ester of general formula (XI) in which:

$R_{4'}$ represents a linear $C_1$–$C_3$ alkyl radical, and $R_{5'}$ is represents a linear or branched $C_2$–$C_6$ alkyl radical.

More preferably, the solvent used is formed by at least one lactic acid ester of general formula (IX) in which $R_{4'}$ represents a methyl radical and $R_{5'}$ represents a linear $C_3$–$C_5$ alkyl radical. In this case, the weight proportions of photoinitiators are from 10 to 50 parts per 100 parts of solvent. This preferred family of solvents, moreover, has the advantage of being very cost-effective, relatively non-toxic, easy to manipulate and compatible with the known initiator salts.

The cationically-crosslinkable polyorganosiloxanes (A) forming part of the composition of the invention have functional groups such as epoxy and/or vinyl ether. The said polyorganosiloxanes (A) are linear or substantially linear and consist of units of formula (VII) and end with units of formula (VIII), or are cyclic and consist of units of formula (VII) represented below:

-continued (VIII)

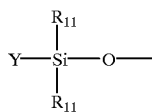

in which:
the symbols $R_{11}$ are identical or different and represent:
a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
a cycloalkyl radical containing between 5 and 8 carbon atoms,
an aryl radical containing between 5 and 12 carbon atoms, which may be substituted, preferably phenyl or dichlorophenyl,
an aralkyl part having an alkyl part containing between 4 and 5 carbon atoms and an aryl part containing between 5 and 12 carbon atoms, optionally substituted on the aryl part with halogens, alkyls and/or alkoxys containing 1 to 3 carbon atoms,
the symbols Y are identical or different and represent:
the group $R_{11}$, a hydrogen radical and/or
a cationically-crosslinkable organofunctional group, preferably an epoxy functional and/or vinyloxy functional group, connected to the silicon of the polyorganosiloxane via a divalent radical containing from 2 to 20 carbon atoms and possibly containing at least one hetero atom, preferably oxygen, and
at least one of the symbols Y representing a cationically-crosslinkable functional organic group.

Preferably, at least one of the symbols $R_{11}$ of the polyorganosiloxanes used in the compositions according to the invention represents a phenyl, xylyl, tolyl or dichlorophenyl radical.

Furthermore, it is advantageous for at least 60 mol % of the radicals $R_{11}$, of the polyorganosiloxanes used in the compositions according to the invention to be methyl radicals.

According to a preferred variant of the invention, 1 to 50%, preferably 5 to 25%, of the silicon atoms of the polyorganosiloxane (A) bear one crosslinkable functional group.

The epoxy functional groups Y of (A) and X of (B) are generally chosen from:

a)

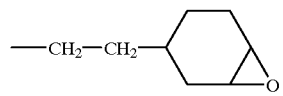

b)

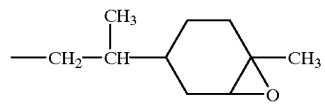

c)

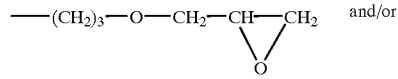 and/or d)

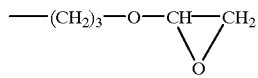

Preferably the epoxy functional groups Y correspond to a).

In addition, the vinyloxy functional groups Y of (A) and X of (B) are generally chosen from:
$(CH_2)_3$—O—CH=$CH_2$
—O—$(CH_2)_4$—O—CH=$CH_2$
and/or $(CH_2)_3$—O—$R_{12}$—O—CH=$CH_2$ in which $R_{12}$ is:
a linear or branched $C_1$–$C_{12}$ alkylene which may be substituted,
a $C_5$–$C_{12}$ arylene, preferably phenylene, which may be substituted, preferably with 1 to 3 $C_1$–$C_6$ alkyl groups.

More particularly, the polyorganosiloxanes (A) used in the compositions according to the invention are of formula:

(IX)

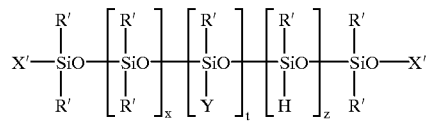

in which:
the symbols R' have the same meaning as $R_{11}$ above for the formulae (VII) and (VIII), and preferably, when R' is a linear or branched alkyl radical, it contains 1 to 4 carbon atoms,
the symbols X' are identical or different and represent a monovalent radical chosen from Y, H and/or OH,
x is an integer or fraction ranging from 20 to 150, preferably 30 to 100,
t is an integer or fraction ranging from 3 to 9, preferably 6 to 9, and
z is an integer or fraction ranging from 0 to 5; preferably 0 to 2.

The epoxy functional polyorganosiloxanes (A) can be prepared by a hydrosilylation reaction between oils containing Si-H units and epoxy functional compounds such as 1,2-epoxy-4-vinylcyclohexane or allyl glycidyl ether.

The vinyloxy functional polyorganosiloxanes (A) can be prepared by a hydrosilylation reaction between oils containing Si-H units and vinyloxy functional compounds such as allyl vinyl ether or allylvinyloxyethoxybenzene.

The polyorganosiloxanes (B) according to the invention can be prepared by hydrosilylation reaction between oils containing Si-H units and monomers containing amino groups and, optionally, vinyloxy functional and/or epoxy functional compounds.

In addition, the polyorganosiloxanes (A) and/or (B) can be prepared by polycondensation reactions, in the presence of an acidic or basic catalyst.

The epoxy functional or vinyloxy functional polyorganosiloxanes (A) used in the context of the invention are generally in the form of fluids having a dynamic viscosity at 25° C. of from 10 to 10,000 mm²/s and preferably from 100 to 600 mm²/s.

The polyorganosiloxanes (B) in accordance with the invention generally have a dynamic viscosity at 25° C. of from 1 to 100,000 mm²/s and preferably from 100 to 600 mm²/s, their viscosity being chosen such that it is compatible with that of the polyorganosiloxanes (A).

The dynamic viscosity at 25° C. of all the silicones considered in the present description can be measured using a Brookfield viscometer, according to AFNOR standard NFT 76 102 of February 1972.

The percentage of amino group(s) generally used by weight relative to the total weight of the polyorganosiloxanes (A) and (B) is between 1 and 1000 ppm and preferably between 10 and 100 ppm. Preferably, in the case of an amino group of HALS type, the amount of amino group is from about 20 to about 300 ppm. This thus means that the amount of polyorganosiloxane (B) in the crosslinkable composition is chosen such that the number of amino groups present in the structure of (B) corresponds to a weight which is within the abovementioned range.

It should be noted that the polyorganosiloxane (B) can be of identical structure to that of the polyorganosiloxane (A), with the exception, needless to say, of the amino group present on (B).

Furthermore, in accordance with the invention, the compositions and coatings obtained using the said compositions are of virtually identical properties in the case in which the polyorganosiloxane (B) has been premixed with the polyorganosiloxane (A) before adding the photoinitiator system, and in the case in which the photoinitiator system has been premixed with the polyorganosiloxane (B) before mixing with the polyorganosiloxane (A). These properties are also confirmed after prolonged storage of the premixes.

The compositions according to the invention can also contain other ingredients such as adhesion modifiers for increasing or decreasing the adhesion forces obtained from the polyorganosiloxane alone (linear silicone resins or polymers bearing vinyl, epoxy, vinyl ether or alcohol functions), pigments, photosensitizers, fungicides, bactericides and antimicrobial agents, corrosion inhibitors, etc.

The compositions according to the invention are useful in the sector of anti-adherent coatings on cellulose materials, films, paints, the encapsulation of electrical and electronic components, coatings for textiles, as well as for sheathing optical fibres.

They are most particularly advantageous when they are used in liquid form in order to make a material, such as metal sheets, glass, plastics or paper, non-adherent to other materials to which it would normally adhere.

The compositions in accordance with the invention advantageously have a viscosity not exceeding 5000 mPa.s, preferably not exceeding 4000 mPa.s, at 25° C. As a variant, compositions whose bath viscosity is between 200 and 1000 mPa.s at 25° C. will be preferred.

The invention is also directed towards a process for making the surface of a first article (for example sheets) non-adherent when the surface comes into contact with a second article, the surface of the first article normally being adherent to the surface of the second article. This process for preparing an article with a non-adherent surface comprises the following steps:
a) applying an amount of the composition according to the invention, generally of between 0.1 and 5 per m² of the surface of the said article,
b) crosslinking the composition by providing energy, at least some of which, preferably all of which, is supplied by UV radiation or by an electron beam ("E.B.").

The UV radiation used has a wavelength of between 200 and 400 nanometers. The irradiation time can be short and is generally less than 1 second and is about a few hundredths of a second for the very small thicknesses of compositions deposited on the surfaces. The crosslinking is advantageously carried out in the absence of any heating. However, heating to between 25 and 100° C. is not excluded from the invention.

Furthermore, the curing time can be adjusted, in particular by a number of UV lamps used, by the duration of exposure to the UV and by the distance between the composition and the UV lamp.

The solvent-free i.e. undiluted, compositions are applied using devices suitable for uniformly depositing small amounts of liquids. To this end, the device known as "Helio glissant" can be used, for example, this device in particular containing two superposed rollers; the role of the lower roller, which dips into the coating vat containing the composition, is to coat the upper roller with a very thin layer, the role of this upper roller then being to deposit the desired amounts of composition with which it is impregnated onto the paper; such metering is obtained by adjusting the respective speed of the two rollers which rotate in opposite directions to each other.

The amounts of compositions deposited on the supports are variable and usually range between 0.1 and 5 g per m² of surface treated. These amounts depend on the nature of the supports and on the desired anti-adherent properties. They are usually between 0.5 and 3 g/m² for non-porous supports.

Another subject of the present invention is articles (for example sheets) consisting of a solid material (metal, glass, plastic, paper, etc.), at least one surface of which is coated with the composition described above, which is photo-crosslinked or crosslinked with a beam of electrons.

The articles, materials or supports thus coated can subsequently be placed in contact with other adhesive materials such as, for example, certain materials of rubber or acrylic type. After pressure contact, the adhesive materials can readily be detached from the article coated with the photo-crosslinked composition.

EXAMPLES

By way of non-limiting examples, compositions in accordance with the invention were prepared and tested.

I. Constituents of the Compositions

A. The functionalized polyorganosiloxanes (A) used in the examples are (1,2-epoxy-4-ethylcyclohexyl) polydimethylsiloxanes of formula (XIII) in which a$\Delta$ and b$\Delta$ have the respective average values 7 and 73.

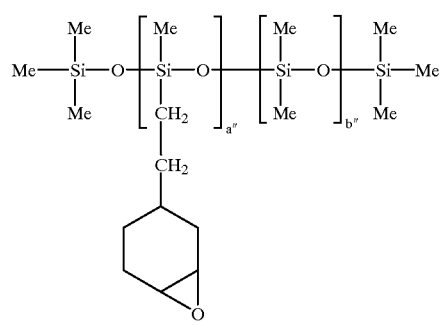

(XIII)

B. The amino agents, consisting of functionalized polyorganosiloxanes (B), used in the examples are of formulae (XIV):

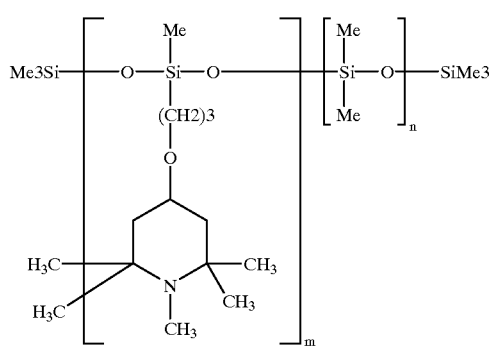

(XIV)

For (XIV) with m=7 and n=700, the MW is 54,275, the viscosity is 9100 mPa.s and the content of amino groups is 20 meq/100 g.

For (XIV) with m=6 and n=37; the MW is 4526 and the content of amino groups is 133 meq/100 g.

For (XIV) with m=37 and n=200; the MW is 27,157 and the content of amino groups is 166 meq/100 g.

C. The photoinitiator used in the examples is an onium borate; ditolyliodonium tetrakis(pentafluorophenyl)borate:

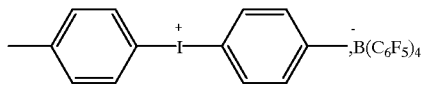

The cationic species of this onium borate and the onium borate are prepared according to the general methodology described in European patent applications Nos. 562,922 and 562,897.

The anionic borate species is prepared according to the procedure below.

Bromopentafluorobenzene (21.3 g, 0.086 mol) and isopropyl ether are loaded, under an inert atmosphere, into a 500 ml round-bottomed flask fitted with a mechanical stirrer, a condenser and a dropping funnel. The mixture is stirred and is cooled to a temperature of −78° C. using an acetone+ cardice bath.

n-Butyllithium dissolved in hexane (1.6 M, 52.3 ml, 0.97 eq) is loaded into the dropping funnel and is then added over about 10 minutes. The mixture is then left stirring for 30 min at a temperature of 78° C.

The dropping funnel is replaced with a dropping funnel containing boron trichloride dissolved in hexane (1.0 M, 19 ml). The boron trichloride is added over 15 min and the reaction mixture is then left stirring at the temperature of −78° C. for 30 min.

The mixture is then allowed to warm to room temperature over about 1 h. Saturated aqueous KCl solution (100 ml) is then added. At this stage, the mixture is two-phase and homogeneous. The isopropyl ether is distilled off. The KB($C_6F_5$)$_4$ precipitates at the end of the distillation. It is recovered by filtration and is then washed with saturated KCl solution (100 ml), after which it is dried under vacuum at a temperature of 35° C.

A product with a titre of 97% of the expected product is thus obtained in a yield of 99%.

The photoinitiator system is prepared by dissolving onium borate (optionally combined with some of the polyorganosiloxane(s) used in the compositions) in isopropyl alcohol.

II. Preparations of Compositions According to the Invention

The onium borate solution prepared is a solution of onium borate at 20% by weight in isopropyl alcohol.

The structures of the polyorganosiloxanes (B) used in the examples are given in Table 1.

Example 1

Without Polyorganosiloxane (B)

2.5 parts by weight of the 20% onium borate solution are added to 100 parts by weight of polyorganosiloxane (A) of formula (XIII). Mixing is then carried out by manual stirring for 1 min.

Examples 2 to 4

2.5 parts by weight of the 20% onium borate solution are added to 100 parts by weight of polyorganosiloxane (A) of formula (XIII), into which the polyorganosiloxane (B) has been introduced beforehand. Mixing is carried out by manual stirring for 1 min.

TABLE 1

| Structure of the polyorganosiloxane (B) [formula (IV)] | Content of amino groups meq N | Weight of polyorganosiloxane (B) introduced into the polyorganosiloxane (A), as ww | Amount of amino group introduced, in ppm, into polyorganosiloxane (A) |
|---|---|---|---|
| Ex. 1  0 | 0 | 0 | 0 |
| Ex. 2  m = 7 and n = 700 | 20 | 983 | 19.66 |
| Ex. 3  m = 6 and n = 37 | 133 | 148 | 19.68 |
| Ex. 4  m = 37 and n = 200 | 166 | 118 | 19.58 |

III. Tests

The following are measured for each composition prepared above in the examples:

the VNC gel time, the gel time at 40° C. in the dark.

Measurement of the VNC Gel Time Under UV

The reactivity tests described in the examples which follow were carried out on a machine for measuring the VNC (vibrating needle curometer) gel point, sold by the company RAPRA Ltd., to which a UV irradiation device was added (Ultracure 100 ss UV generator).

During the crosslinking, the VNC needle inserted into the mixture to be studied encounters a resistance which is expressed by a decrease in the output voltage of the apparatus. The gel time is the time measured at the maximum vibration damping point.

Measurement of the Gel Time at 40° C.

The composition to be tested is conditioned in a glass flask. The flask is closed and then placed in a water bath at 40° C. The assembly is placed in the absence of light.

The passage from the liquid state to the solid state (hours, days) is examined visually over time and in the absence of light.

A. The results of the measurements carried out for the compositions of Examples 1 to 4 are given in Table 2.

TABLE 2

| Examples | VNC gel time in min | Stability at 40° C./dark |
| --- | --- | --- |
| 1 | 0.9 | gel in 10 min |
| 2 | 1.3 | >14 days |
| 3 | 1.4 | >14 days |
| 4 | 1.4 | >14 days |

B. Tests were carried out to compare the reactivity and stability of the compositions with various concentrations of polyorganosiloxsane (B) of formula (XIV) with m=6 and n=37.

The preparation for Example 4 is identical to that for Example 3 and the results obtained with the compositions of Examples 3 and 4 are given in Table 3.

TABLE 3

| | Weight of polyorgano-siloxane (B) introduced into polyorgano-siloxane (A), in ppm | Amount of amino group introduced, in ppm, into polyorgano-siloxane (A) | VNC gel time in min | Stability at 40° C./dark |
| --- | --- | --- | --- | --- |
| Ex. 1 | 0 | 0 | 0.9 | 10 min |
| Ex. 3 | 148 | 19.68 | 1.4 | 14 days |
| Ex. 4 | 344 | 59.04 | 2.3 | 14 days |

According to the results of Table 3, the multiplication of the concentration of amino groups by a factor of three doubles the gel time. This means, in the present case, that the reactivity is halved when the concentration of amino groups is multiplied by three. The stability of the bath is still greater than 14 days.

C. Tests to compare the reactivity and stability of the compositions according to the invention were carried out with the composition of Example 3 and the composition of Example 5.

Example 5

The components of the composition of Example 5 are identical to those of Example 3. Before mixing with the polyorganosiloxane (A), the polyorganosiloxane (B) is added to the onium salt solution.

The weight of (B) introduced into the onium solution is 5920 ppm, which corresponds to an amount of amino groups of 787 ppm in the onium salt solution.

In the two cases, the final concentration of amino groups is identical (i.e. 19.6 ppm of amino groups in the 102.5 g of mixture).

The reactivity and stability of these baths are measured as above. The results are virtually identical and are given below in Table 4.

TABLE 4

| | Amount of amino groups in (A), in ppm | | Poly-organo-siloxane (B) added, in ppm | VNC gel time in min | Stability at 40° C./dark |
| --- | --- | --- | --- | --- | --- |
| | in (A) | in catalyst | | | |
| Ex. 1 | 0 | 0 | 0 | 0.9 | 10 min |
| Ex. | 0 | 0 | 19.68 | 1.4 | " |
| Ex. 5 | 148 | 5920 | 19.68 | 1.5 | " |

It is observed that when the polyorganosiloxane (B) is premixed with the onium salt solution, the test results are identical to those of a composition in which the polyorganosiloxane (B) has been premixed with the polyorganosiloxane (A).

What is claimed is:

1. A stable composition which is crosslinkable under radiation, comprising at least one polyorganosiloxane (A) containing crosslinkable functional groups, which is stable on use and on storage, at least one stabilizing amino agent being a polyorganosiloxane (B) functionalized with at least one amino group, and a system for initiating curing under radiation, the polyorganosiloxane (B) being miscible with the polyorganosiloxane (A).

2. A stable composition which is crosslinkable under radiation according to claim 1, wherein said radiation is UV.

3. A stable composition which is crosslinkable under radiation according to claim 2, wherein the system for initiating curing under radiation comprises an onium salt.

4. A composition according to claim 3, wherein the onium salt is selected from the group consisting of:

[(Φ-CH$_3$)$_2$I]$^+$,[B(C$_6$F$_5$)$_4$]$^-$,   [(C$_8$H$_{17}$—O-Φ-I-Φ]$^+$, [B(C$_6$F$_5$)$_4$]$^-$,
[C$_{12}$H$_{25}$-Φ)$_2$I]$^+$,[B(C$_6$F$_5$)$_4$]$^-$,   [CH$_3$-Φ-I-Φ-CH(CH$_3$)$_2$]$^+$, [B(C$_6$F$_5$)$_4$]$^-$,
[CH$_3$-Φ-I-Φ-CH(CH$_3$)$_2$]$^+$,   and
[B(C$_6$H$_4$OCF$_3$)$_4$]$^-$,
2[B(C$_6$F$_5$)$_4$]$^-$,[(Φ)$_2$S-Φ-S-Φ-S(Φ)$_2$]$^{+2}$.

5. A composition according to claim 1, wherein the polyorganosiloxane (A) contains functional epoxy or vinyl groups.

6. An anti-adherent coating comprising a composition as defined in claim 2.

7. A stable composition which is crosslinkable under radiation according to claim 1, wherein the amino group of the polyorganosiloxane (B) is an amino group wherein the amine is sterically hindered.

8. A stable composition which is crosslinkable under radiation according to claim 1, wherein the polyorganosiloxane (B) is a linear, cyclic or three-dimensional polyorganosiloxane with a molecular mass of from 200 to 200,000 grams per mole and comprising identical or different units of general formula (I):

$$R_aX_bV_cSiO_{\frac{4-(a+b+c)}{2}} \qquad (I)$$

wherein:

(1)
 a=0, 1, 2 or 3,
 b=0, 1, 2, or 3,
 c=0, 1, 2 or 3, and
 a+b+c≦3;

(2) the symbols R are identical or different and represent a monovalent hydrocarbon radical selected from the group consisting of a linear alkyl radical containing from 1 to 4 carbon atoms, a branched alkyl radical containing from 1 to 4 carbon atoms, a hydrogen atom, a linear alkoxy radical containing from 1 to 4 carbon atoms, a branched alkoxy radical containing from 1 to 4 carbon atoms, a phenyl radical and a hydroxyl radical;

(3) the symbols X are cationically crosslinkable, identical or different functional residues, connected to the silicon of the polyorganosiloxane via a divalent radical containing from 2 to 20 carbon atoms and which optionally contain at least one hetero atom, (4) the symbols V are identical or different functional residues and represent a residue containing one or more sterically hindered piperidyl groups of formula:

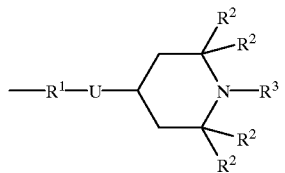
(II)

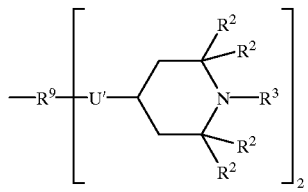
(III)

wherein, for the residues of formula (II):

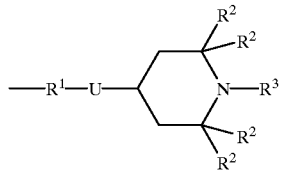
(II)

$R^1$, a divalent radical, is:
- a linear or branched alkylene radicals containing 2 to 18 carbon atoms;
- an alkylenecarbonyl radical wherein the alkylene part is linear or branched and contains 2 to 20 carbon atoms;
- an alkylenecyclohexylene radical wherein the alkylene part is linear or branched and contains 2 to 12 carbon atoms and the cyclohexylene part contains an OH group and, optionally, 1 or 2 alkyl radicals containing 1 to 4 carbon atoms;
- a radical of formula —$R^4$—O—$R^4$ wherein the radicals $R^4$, identical or different, represent alkylene radicals containing 1 to 12 carbon atoms;
- a radical of formula —$R^4$—O—$R^4$ wherein the radicals $R^4$ have the meanings given above and one or both of them are substituted with one or two —OH group(s);
- a radical of formula —$R^4$—COO—$R^4$ wherein the radicals $R^4$ represent alkylene radicals containing 1 to 12 carbon atoms, one or both of them being optionally substituted with one or two —OH group(s); or
- a radical of formula —$R^5$—O—$R^6$—O—CO—$R^5$ wherein the radicals $R^5$ and $R^6$, which are identical or different, represent alkylene radicals containing 2 to 12 carbon atoms and the radical $R^6$ is optionally substituted with a hydroxyl radical;

U represents —O— or —$NR^7$—, $R^7$ being a hydrogen atom, a linear or branched alkyl radical containing 1 to 6 carbon atoms or a divalent radical of formula:

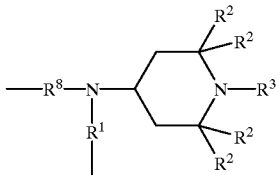

wherein $R^1$ has the meaning given above, $R^2$ and $R^3$ have the meanings given below and $R^8$ represents a linear or branched divalent alkylene radical containing from 1 to 12 carbon atoms, one of the valency bonds (that of $R^8$) being connected to the atom of —$NR^7$—, the other (that of $R^1$) being connected to a silicon atom;

the radicals $R^2$ are identical or different and are linear or branched alkyl radicals containing 1 to 3 carbon atoms or a phenyl radical;

the radical $R^3$ represents a hydrogen radical or the radical $R^2$ or O●.

wherein, for the residues of formula (III):

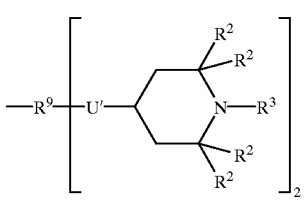
(III)

$R^9$ is a trivalent group of formula:

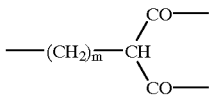

wherein m represents a number from 2 to 20, or a trivalent group of formula:

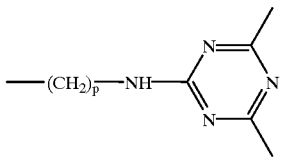

wherein p represents a number from 2 to 20;

U' represents —O— or $NR^{10}$—, $R^{10}$ being a hydrogen atom, a linear or branched alkyl radical containing 1 to 6 carbon atoms;

$R^2$ and $R^3$ have the same meanings as those given with regard to formula (II).

9. A stable composition which is crosslinkable under radiation according to claim 8, wherein:

(2) the symbols R are an ethoxy radical, a methoxy radical or a methyl radical; and (3) the symbols X are an epoxy functional or a vinyloxy functional group, connected to the silicon of the polyorganosiloxane via a divalent radical containing from 2 to 20 carbon atoms and which optionally contains at least one oxygen atom.

10. A stable composition which is crosslinkable under radiation according to claim 8, wherein the polyorganosiloxane (B) has a molecular mass of from 1000 to 50,000 g per mole.

11. A stable composition which is crosslinkable under radiation according to claim 8, wherein the polyorganosiloxane (B) is of average general formula (IV):

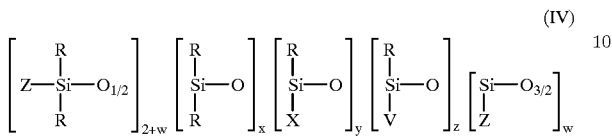

(IV)

wherein:
(1') the symbols R are identical or different and have the meanings given above;
(2') the symbols X are identical or different and have the meanings given above;
(3') the symbols V are identical or different and have the meanings given above;
(4') the symbols Z are identical or different and represent R or V as defined above; and
(5') x, y, z and w are totally independent fractional values with:
4<x+y+z+w<10,000,
0<x<8000,
0<y<1000,
0.2<z<500, and
0<w<300.

12. A stable composition which is crosslinkable under radiation according to claim 11, wherein:
10<x+y+z+w<2000,
2<x<1500,
1<y<200,
1<z<100, and
0<w<100.

13. A stable composition which is crosslinkable under radiation according to claim 12, wherein the independent fractional values x, z and w of the polyorganosiloxane (B) are such that:
20<x+y+z+w<100
5<x<80
2<y<10
1<z<50
and 0<w<5.

14. A stable composition according to claim 11, wherein the symbol Z is a sterically hindered cyclic amine containing, α to the nitrogen atom, branched alkyl groups of 1 to 4 carbon atoms.

15. A stable composition according to claim 14, wherein the sterically hindered amine is an amine containing at least one piperidyl unit.

16. A stable composition which is crosslinkable under radiation according to claim 2, wherein the system for initiating curing under radiation comprises at least one onium salt of an element from groups VA, VIA and VIIA of the Periodic Table, wherein the cationic species of the said onium salt is an onium salt of formula:

[(R$_{1'}$)$_n$—A—(R$_{2'}$)m]$^+$  (V)

wherein:
A represents an element from groups VA, VIA and VIIA, the symbol R$_{1'}$ represents a C$_6$–C$_{20}$ carbocyclic or heterocyclic aryl radical, said heterocyclic radical optionally containing nitrogen or sulphur atoms as hetero elements, the symbol R$_{2'}$ represents R$_{1'}$, a linear alkyl containing 1 to 30 carbon atoms, a branched alkyl containing 1 to 30 carbon atoms, a branched alkenyl containing 1 to 30 carbon atoms, or a linear alkenyl containing 1 to 30 carbon atoms, the radicals R$_{1'}$ and R$_{2'}$ optionally being substituted with an alkoxy group containing between 1 and 25 carbon atoms, an alkyl group containing 1 to 25 carbon atoms, a nitro group, a chloro group, a bromo group, a cyano group, a carboxyl group, or a mercapto group, n is an integer ranging from 1 to v+1, v being the valency of the element A, and m is an integer ranging from 0 to v−1, with n+m=v+1.

17. A stable composition which is crosslinkable under radiation according to claim 16, wherein the anionic species of the said onium salt is SbF$_6^-$, AsF$_6^-$, BF$_4^-$, PF$_6^-$, CF$_3$SO$_3^-$, B(O$_3$SCF$_3$)$_4^-$, B(O$_3$SC$_2$F$_5$)$_4^-$ or B(O$_3$SC$_4$F$_9$)$_4^-$.

18. A stable composition which is crosslinkable under radiation according to claim 16, wherein the anionic species is an anionic borate species of formula [BX$_{a'}$(R$_{3'}$)b']$^-$(VI), wherein:
a' is an integer between 0 and 3,
b' is an integer between 1 and 4, with a'+b'=4,
the symbols X represent:
a halogen atom, with a'=0 to 3, or
an OH function with a'=0 to 2,
the symbols R$_{3'}$ are identical or different and represent:
a phenyl radical substituted with at least one electron-withdrawing group or with at least two halogen atoms, or
an aryl radical containing at least two aromatic rings, optionally substituted with at least one electron-withdrawing element or group, or a halogen atom.

19. A stable composition which is crosslinkable under radiation according to claim 18, wherein
the symbols R$_{3'}$ are identical or different and represent:
a phenyl radical substituted with at least one electron-withdrawing group being CF$_3$, OCF$_3$, NO$_2$ or CN, or
the at least two halogen atoms being fluorine, or
a biphenyl or naphthyl group, optionally substituted with at least one electron-withdrawing element or group which is CF$_3$, NO$_2$ or CN, or fluorine.

20. A composition according to claim 5, wherein the polyorganosiloxane (A) is linear and consists of units of formula (VII) and ends with units of formula (VIII), or is cyclic and consists of units of formula (VII):

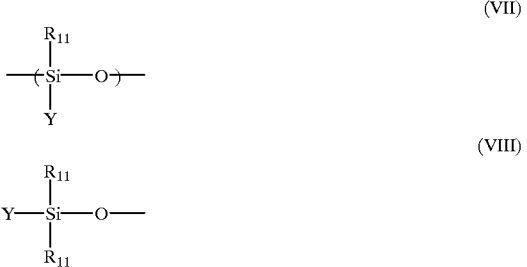

wherein:
the symbols R$_{11}$ are identical or different and represent:

a linear or branched alkyl radical containing 1 to 8 carbon atoms, optionally substituted with at least one halogen, a cycloalkyl radical containing between 5 and 8 carbon atoms, an aryl radical containing between 6 and 12 carbon atoms, which is optionally substituted with two chloro groups, or an aralkyl part having an alkyl part containing between 4 and 5 carbon atoms and an aryl part containing between 6 and 12 carbon atoms, optionally substituted on the aryl part with halogens, alkyls or alkoxys containing 1 to 3 carbon atoms, the symbols Y are identical or different and represent:
the group $R_{11}$, a hydrogen radical or a cationically crosslinkable organofunctional group connected to the silicon of the polyorganosiloxane via a divalent radical containing from 2 to 20 carbon atoms and optionally containing at least one hetero atom, and at least one of the symbols Y representing a cationically-crosslinkable functional organic group.

21. A composition according to claim 20, wherein
the symbols $R_{11}$ are identical or different and represent:
a linear or branched alkyl radical containing 1 to 8 carbon atoms, optionally substituted with a fluorine, the alkyl radicals being methyl, ethyl, propyl, octyl or 3,3,3-trifluoropropyl, or a phenyl or dichlorophenyl,
the symbols Y are identical or different and represent:
the group $R_{11}$, a hydrogen radical or an epoxy functional or vinyloxy functional group, connected to the silicon of the polyorganosiloxane via a divalent radical containing from 2 to 20 carbon atoms and, optionally, containing at least one oxygen atom, and at least one of the symbols Y representing a cationically-crosslinkable functional organic group.

22. A composition according to claim 20, wherein said polyorganosiloxane (B) has a viscosity at 25° C. of from about 10 to 10,000 $mm^2/s$.

23. A process for preparing a crosslinkable composition as defined in claim 2, comprising the following steps:
a) mixing an amino agent with the polyorganosiloxane in order to form a first stabilized composition, and then
b) adding a second miscible composition comprising the system for initiating curing in order to form the said crosslinkable composition.

24. A process according to claim 23, wherein the second composition is in liquid form, the curing initiator optionally being dissolved in a solvent which is compatible with the polyorganosiloxane.

25. A process for preparing articles with a non-adherent surface, wherein said process comprises the following steps:
a) applying between 0.1 and 5 g per $m^2$ of the surface of said article, of a composition as defined in claim 25, and
b) crosslinking said composition by providing energy, at least some of which is supplied by UV radiation or by an electron beam.

26. A process according to claim 25, wherein the crosslinking operation is carried out by UV radiation of wavelength from about 200 to 400 nanometers.

27. An article with an anti-adherent surface obtained by the process as defined in claim 23.

* * * * *